U. E. MAILLE.
ELECTRIC SIGNALING SYSTEM.
APPLICATION FILED SEPT. 7, 1915.
1,183,476.
Patented May 16, 1916.
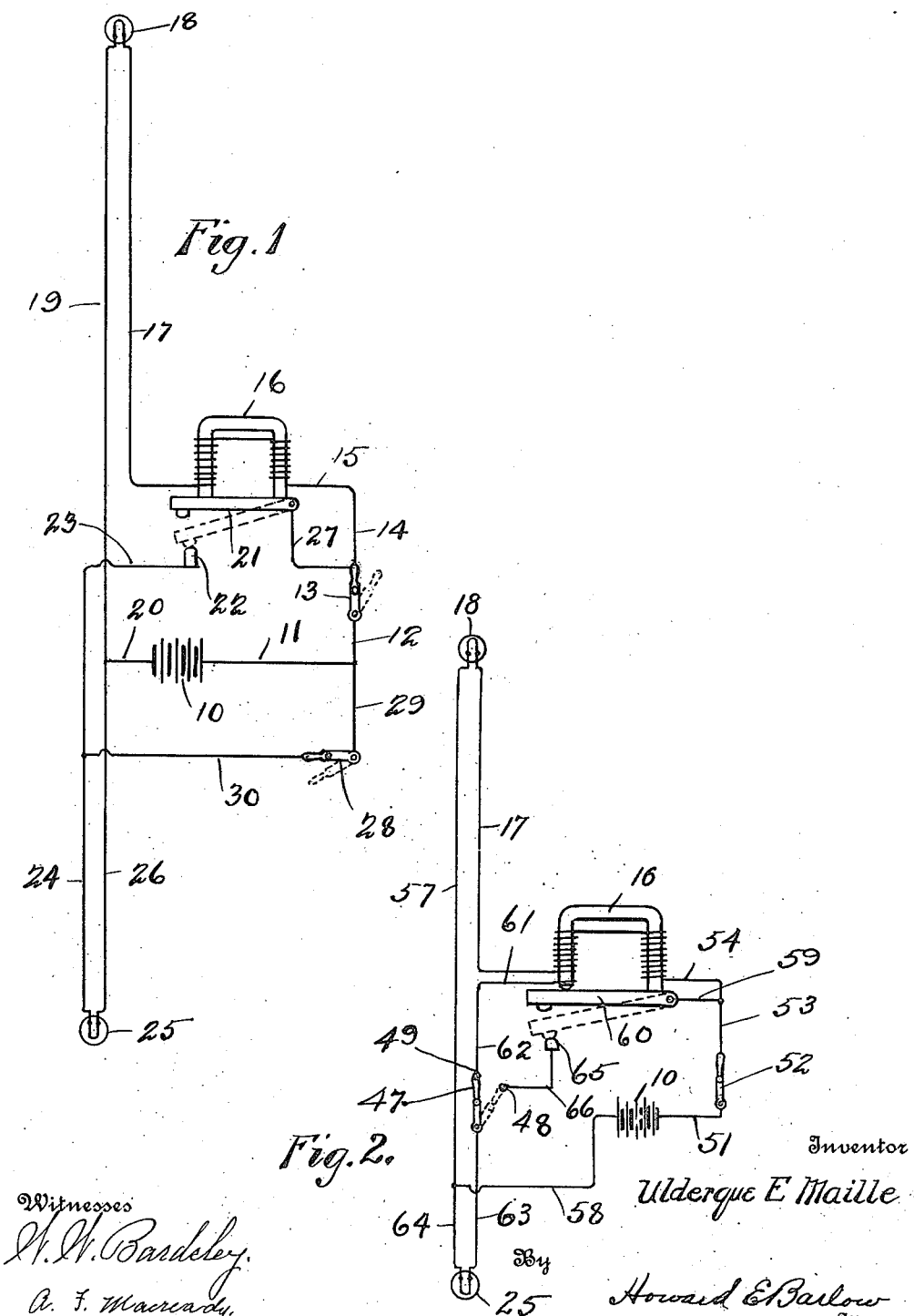
Witnesses
W. W. Bardsley.
A. F. Macready.
Inventor
Ulderque E. Maille
By Howard E. Barlow
Attorney

UNITED STATES PATENT OFFICE.

ULDERQUE E. MAILLE, OF PROVIDENCE, RHODE ISLAND, ASSIGNOR TO ALBERT I. RUSSELL, OF PROVIDENCE, RHODE ISLAND.

ELECTRIC SIGNALING SYSTEM.

1,183,476.   Specification of Letters Patent.   Patented May 16, 1916.

Application filed September 7, 1915.   Serial No. 49,166.

*To all whom it may concern:*

Be it known that I, ULDERQUE EDWARD MAILLE, a citizen of the United States, and resident of the city of Providence, in the county of Providence and State of Rhode Island, have invented certain new and useful Improvements in Electric Signaling Systems, of which the following is a specification.

The object of this invention is to provide simple, practical and effective means for indicating, by electric means, to the driver of a motor vehicle, when for any cause, the tail light of his vehicle has been extinguished.

In the practical operation of motor vehicles, after dark, it is found to be of utmost importance that the tail light should be kept burning in order to notify vehicles approaching from the rear and so prevent rear end collisions.

The law also requires that the tail light shall be lighted whether the vehicle is standing or in motion. As this light is out of sight of the driver it may be extinguished without his knowledge. Therefore in order to notify the driver that trouble has occurred with the tail light I have provided means in the electric circuit, whereby a cessation of current through the tail-light, will cause an indicator to be operated and so notify the driver that this light requires his immediate attention.

With these and other objects in view, the invention consists of certain novel features of construction, as will be more fully described, and particularly pointed out in the appended claims.

In the accompanying drawings: Figure 1— is a diagrammatic view illustrating one arrangement of wiring whereby a vehicle lamp is lighted on the dash board of the vehicle when the tail-light has been accidentally extinguished. Fig. 2— is a diagrammatic view illustrating means whereby the dash light may be placed in circuit with the tail light to be extinguished simultaneously therewith, or the dash light may be placed normally out of circuit with the tail light to be automatically lighted when the circuit through the tail light is broken.

My improved device is primarily designed to be attached to an automobile electric lighting system and consists essentially of a normally closed circuit in which is located a battery 10, or other convenient source of power, from which the current passes through the wires 11 and 12, and switch 13, which latter is adapted to be moved by hand to complete the circuit when it is desired to light the rear lamp, this current then passes through wires 14 and 15 and through the electromagnet 16 and wire 17 through the red lamp 18 which is located in the rear of the vehicle. When this lamp is working properly the current passes through its carbon and back through the wires 19 and 20 to the battery 10 to complete the circuit.

The current in passing through the electro magnet 16 acts upon the armature 21 to hold the same against its poles and so long as the current continues to flow, this armature is held up in that position, but if for any reason the lamp 18 should burn out or trouble should occur in the wiring to prevent the flow of current through this lamp, the electro-magnet 16 would at once become deënergized and permit the armature 21 to fall to the position illustrated in dotted lines in Fig. 1 to engage the contact 22, thereby completing another and normally open circuit from the battery 10 through wires 11, 12 and 27, armature 21, wires 23 and 24, dash light 25, and wires 26 and 20, back to the batteries 10, thus lighting this lamp 25 which is located on the dash board or other convenient position, to at once visually notify the driver that trouble has occurred in the tail lamp. By this arrangement of circuits and mechanism, it will be seen that an indicating lamp is automatically lighted when the tail light has been accidentally extinguished by the cessation of current passing therethrough.

In addition to the circuits above described, I have provided another circuit having a hand operated switch 28 adapted to be moved to complete this circuit from the battery through wires 11 and 29 through switch 28, wires 30 and 24, through the light 25 and back through wires 26 and 20, whereby this light may be lighted by hand when it is desired to illuminate the mechanism on the dash such as the speed-armature, clock, etc., at the front portion of the car.

The most important, of my three wiring systems is illustrated in Fig. 2, in which three distinct circuits are used. One leading from the battery 10 through wire 51 switch 42 wires 53 and 54 magnet 16 wire 17 and tail light 18 back through wires 57 and 58 to the battery. The second circuit leading from the battery through wire 51 switch 52 wires 53 and 59 across the armature 60 of the electro-magnet, which in this case serves as a conductor, through which the current flows to wires 61 and 62 hand operated switch 47 wire 63 indicator lamp 25 and wires 64 and 58 back to the battery. From the above it will be seen that these two circuits coöperate one with the other, whereby if for any reason the circuit is broken through the tail light the armature 60 drops and automatically opens the circuit through the indicator lamp and so extinguishes the same.

To complete the third circuit the hand operated switch 47 is first moved into connection with contact 48 then the current passes from battery 10 through wire 51 switch 52 wires 53 and 59 and across the armature 60 when it is dropped to dotted position illustrated in this figure, to make the connection through the contact 65, and wire 66 and through said hand switch 47 thence through wire 63 and indicator lamp 25 back through wires 64 and 58 to the battery. It will be seen that this third circuit is normally open and is closed by trouble occurring in the circuit through the tail lamp which deënergizes the magnet 10, permitting the armature 60 to fall and complete the circuit which will light the indicator lamp and so show to the driver that trouble has occurred with the tail lamp. Therefore it will be seen by this arrangement, the dash light may be either normally lighted or normally extinguished and when so lighted, a break through the tail light will extinguish the dash light to notify the driver of trouble, but when it is desired to have this dash light normally extinguished, the switch 47 is placed in the opposite position or on contact 48 which causes this dash lamp to be lighted when trouble occurs with the tail lamp and so in this way notify the driver of existing trouble.

I claim:

1. An electric signaling system comprising a normally closed lighting circuit including a source of energy, an electromagnet and a signal light, a branch circuit including an armature for said magnet and an indicator lamp, a hand switch controlling the same, said branch circuit being normally closed when said magnet is energized, a conductor coöperating with said armature, said hand switch, said indicator lamp, and said source of energy to form a second branch circuit when the magnet is deënergized.

2. An electric lighting system comprising a normally closed lighting circuit including a signal light, a normally open branch circuit shunting said light, a normally closed branch circuit also shunting said light, and a single switch controlling both branch circuits, both branch circuits containing a telltale device.

3. An electric lighting system comprising a normally closed lighting circuit including a signal light, a normally open branch circuit shunting said light, a normally closed branch circuit also shunting said light, and a single switch controlling both branch circuits, both branch circuits containing a telltale device, said lighting circuit including means for maintaining the first branch circuit normally closed.

4. An electric lighting system comprising a normally closed lighting circuit including a signal light, a normally open branch circuit shunting said light, a second branch circuit also shunting said light and including a manually operated switch, both of said branch circuits including a common telltale device.

In testimony whereof I affix my signature in presence of two witnesses.

ULDERQUE E. MAILLE.

Witnesses:
HOWARD E. BARLOW,
A. F. MACREADY.